(12) United States Patent
Lin et al.

(10) Patent No.: US 10,990,782 B2
(45) Date of Patent: Apr. 27, 2021

(54) OPERATING METHOD OF AN OPTICAL FINGERPRINT CAPTURE APPARATUS AND OPERATING METHOD OF AN OPTICAL FINGERPRINT RECOGNITION SYSTEM

(71) Applicant: NOVATEK MICROELECTRONICS CORP., Hsinchu Science Park (TW)

(72) Inventors: Chun-Yen Lin, Zhubei (TW); Ping Liu, Hsinchu (TW); Chi-Ting Chen, Hsinchu (TW)

(73) Assignee: NOVATEK MICROELECTRONICS CORP., Hsinchu Science Park (TW)

( * ) Notice: Subject to any disclaimer, the term of this patent is extended or adjusted under 35 U.S.C. 154(b) by 60 days.

(21) Appl. No.: 16/676,809

(22) Filed: Nov. 7, 2019

(65) Prior Publication Data

US 2021/0073508 A1    Mar. 11, 2021

Related U.S. Application Data

(60) Provisional application No. 62/897,736, filed on Sep. 9, 2019.

(51) Int. Cl.
*G06K 9/00* (2006.01)
(52) U.S. Cl.
CPC ..... *G06K 9/00013* (2013.01); *G06K 9/00087* (2013.01)
(58) Field of Classification Search
CPC .................. G06K 9/00604; G06K 9/00778
See application file for complete search history.

(56) References Cited

U.S. PATENT DOCUMENTS

| | | | | |
|---|---|---|---|---|
| 5,239,393 A * | 8/1993 | Takeuchi | ............... | G03G 15/04 358/474 |
| 8,174,271 B2 * | 5/2012 | Hirasaka | ............ | H03K 17/9622 324/672 |
| 8,542,395 B2 * | 9/2013 | Ogura | .................. | H04N 1/0473 358/1.16 |
| 2003/0035570 A1 * | 2/2003 | Benkley, III | ......... | G06K 9/0002 382/124 |
| 2007/0262237 A1 * | 11/2007 | Mann | ................. | H04N 5/37457 250/208.1 |
| 2008/0049240 A1 * | 2/2008 | Yamamoto | ................ | G06T 1/60 358/1.9 |
| 2009/0256060 A1 * | 10/2009 | Meynants | ......... | H01L 27/14612 250/208.1 |
| 2010/0329421 A1 * | 12/2010 | Ruetten | ................. | G01T 1/2018 378/62 |

(Continued)

*Primary Examiner* — John B Strege
(74) *Attorney, Agent, or Firm* — Hamre, Schumann, Mueller & Larson, P.C.

(57) ABSTRACT

An operating method of an optical fingerprint capture apparatus includes: by the apparatus upon receipt of a scan command from a host, entering an exposure mode where an image sensor thereof is exposed to light carrying information of a fingerprint; by the apparatus upon complete exposure of the image sensor to the light, entering a sample mode where multiple pieces of pixel data that cooperatively represent an image of the fingerprint are obtained and written to a data buffer thereof; and by the apparatus at a predetermined output time point that is later than a start of the sample mode and earlier than an end of the sample mode, outputting an interrupt request to cause the host to start reading the pieces of pixel data from the data buffer.

14 Claims, 7 Drawing Sheets

(56) References Cited

U.S. PATENT DOCUMENTS

| | | | |
|---|---|---|---|
| 2018/0089114 A1* | 3/2018 | Hanscom | G06F 13/1673 |
| 2018/0098096 A1* | 4/2018 | Chao | H04N 19/182 |
| 2019/0370172 A1* | 12/2019 | Bushell | G06F 3/0671 |
| 2020/0110919 A1* | 4/2020 | Qiu | G06K 9/00013 |
| 2020/0167542 A1* | 5/2020 | Hu | G07C 9/37 |
| 2020/0210673 A1* | 7/2020 | Krah | H04N 5/3575 |

* cited by examiner

OPERATING METHOD OF AN OPTICAL FINGERPRINT CAPTURE APPARATUS AND OPERATING METHOD OF AN OPTICAL FINGERPRINT RECOGNITION SYSTEM

CROSS-REFERENCE TO RELATED APPLICATION

This application claims priority of U.S. Provisional Patent Application No. 62/897,736, filed on Sep. 9, 2019.

FIELD

The disclosure relates to optical fingerprint recognition, and more particularly to an operating method of an optical fingerprint capture apparatus and to an operating method of an optical fingerprint recognition system.

BACKGROUND

In a conventional optical fingerprint recognition system, an optical fingerprint capture apparatus outputs an interrupt request upon completion of writing multiple pieces of pixel data that cooperatively represent an image of a fingerprint to a data buffer thereof, so as to cause a host to start reading the pieces of pixel data from the data buffer and then perform a predetermined action (e.g., authentication) based on the pieces of pixel data. This is adverse tor educe total processing time of the conventional optical fingerprint recognition system.

SUMMARY

Therefore, an object of the disclosure is to provide an operating method of an optical fingerprint capture apparatus. The operating method can alleviate the drawback of the prior art.

According to an aspect of the disclosure, the operating method includes: by the optical fingerprint capture apparatus upon receipt of a scan command from a host, entering an exposure mode where an image sensor thereof is exposed to light carrying information of a fingerprint; by the optical fingerprint capture apparatus upon complete exposure of the image sensor to the light, entering a sample mode where multiple pieces of pixel data that cooperatively represent an image of the fingerprint are obtained and written to a data buffer thereof; and by the optical fingerprint capture apparatus at a predetermined output time point that is later than a start of the sample mode and that is earlier than an end of the sample mode, outputting an interrupt request to cause the host to start reading the pieces of pixel data from the data buffer.

Another object of the disclosure is to provide an operating method of an optical fingerprint recognition system. The operating method can alleviate the drawback of the prior art.

According to the disclosure, the operating method includes: by a host of the optical fingerprint recognition system, transmitting a scan command to an optical fingerprint capture apparatus of the optical fingerprint recognition system; by the optical fingerprint capture apparatus upon receipt of the scan command from the host, entering an exposure mode where an image sensor thereof is exposed to light carrying information of a fingerprint; by the optical fingerprint capture apparatus upon complete exposure of the image sensor to the light, entering a sample mode where multiple pieces of pixel data that cooperatively represent an image of the fingerprint are obtained and written to a data buffer thereof; by the optical fingerprint capture apparatus at a predetermined output time point that is later than a start of the sample mode and that is earlier than an end of the sample mode, outputting an interrupt request to the host; and by the host upon receipt of the interrupt request from the optical fingerprint capture apparatus, starting reading the pieces of pixel data from the data buffer.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
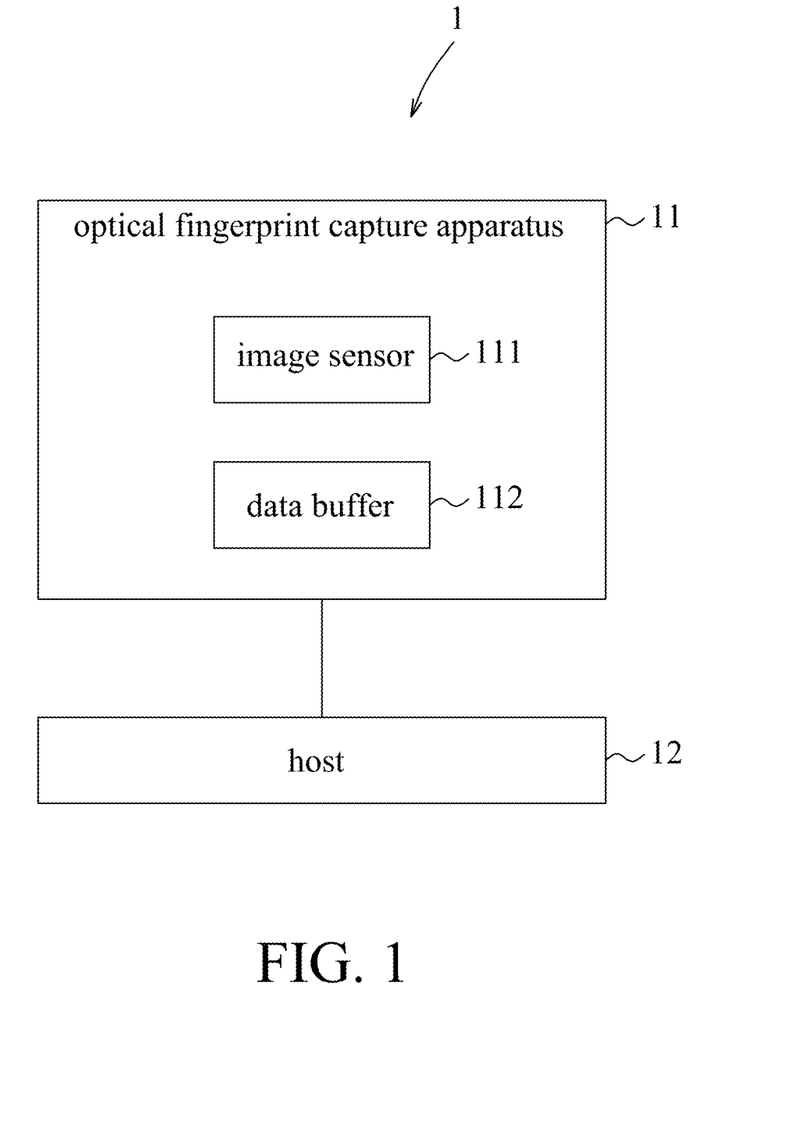
FIG. 1 is a block diagram illustrating an optical fingerprint recognition system.
Figure 2:
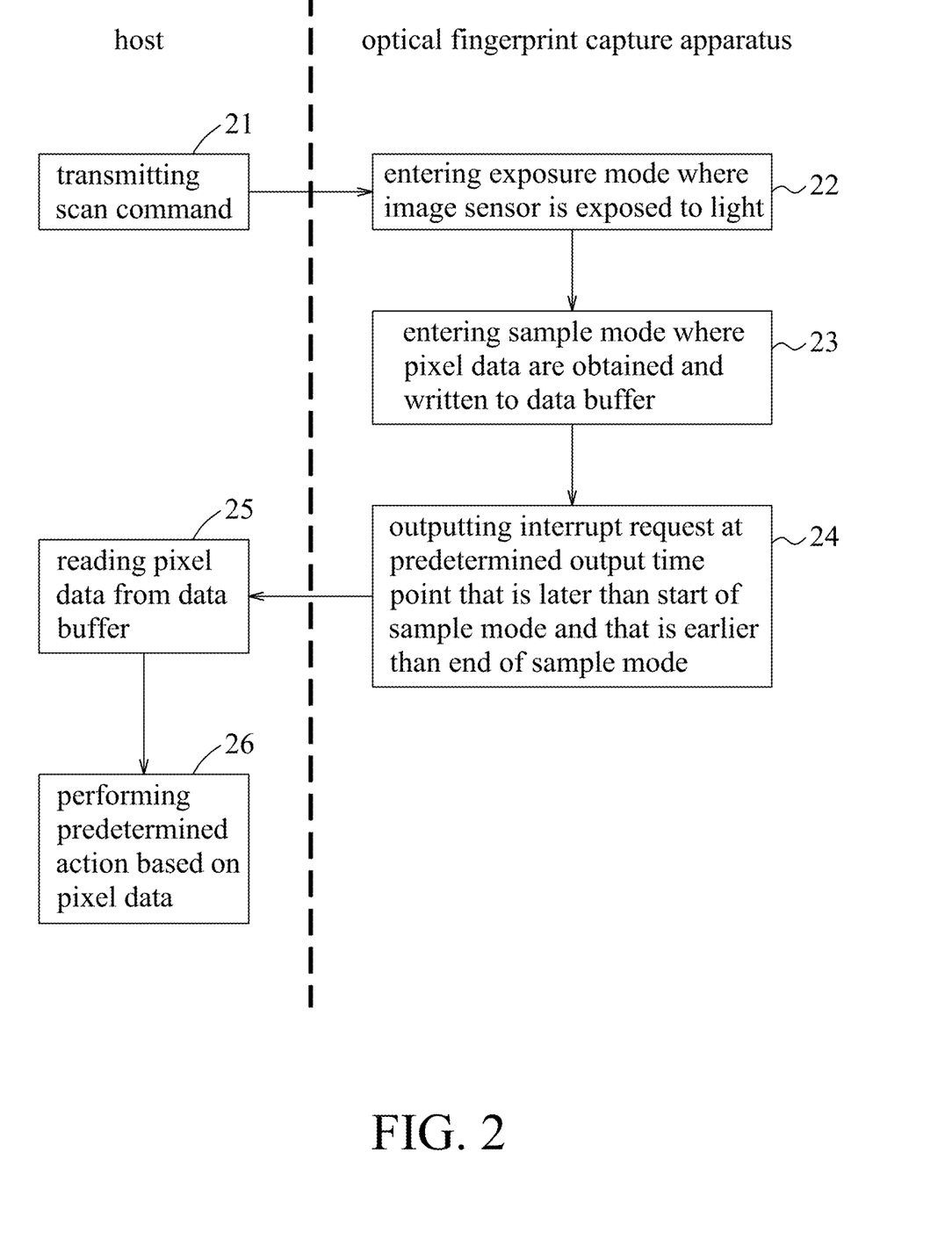
FIG. 2 is a flowchart illustrating a first embodiment of an operating method of the optical fingerprint recognition system shown in FIG. 1 according to the disclosure.

FIGS. 1 and 2 illustrate a first embodiment of an operating method of an optical fingerprint recognition system 1 according to the disclosure. As shown in FIG. 1, the optical fingerprint recognition system 1 includes a host 12, and an optical fingerprint capture apparatus 11 that is coupled to the host 12, and that includes an image sensor 111 and a data buffer 112 (e.g., a static random access memory (SRAM) device). As shown in FIG. 2, the operating method includes the following steps 21-26.

In step 21, the host 12 transmits a scan command to the optical fingerprint capture apparatus 11.

In step 22, upon receipt of the scan command from the host 12, the optical fingerprint capture apparatus 11 switches from an idle mode to an exposure mode where the image sensor 111 is exposed to light carrying information of a fingerprint.

In step 23, upon complete exposure of the image sensor 111 to the light, in which the exposure is considered complete when it reaches a predetermined condition, the optical fingerprint capture apparatus 11 switches from the exposure mode to a sample mode where multiple pieces of pixel data that cooperatively represent an image of the fingerprint are obtained and written to the data buffer 112. Thereafter, upon completion of writing the pieces of pixel data to the data buffer 112, the optical fingerprint capture apparatus 11 switches from the sample mode back to the idle mode.

In step 24, at a predetermined output time point that is later than a start of the sample mode and that is earlier than an end of the sample mode, the optical fingerprint capture apparatus 11 outputs an interrupt request to the host 12.

In step 25, upon receipt of the interrupt request from the optical fingerprint capture apparatus 11, the host 12 starts reading the pieces of pixel data from the data buffer 112 through, for example, a serial peripheral interface (SPI).

In step 26, upon completion of reading the pieces of pixel data from the data buffer 112, the host 12 performs a predetermined action (e.g., authentication) based on the pieces of pixel data.

Figure 3:
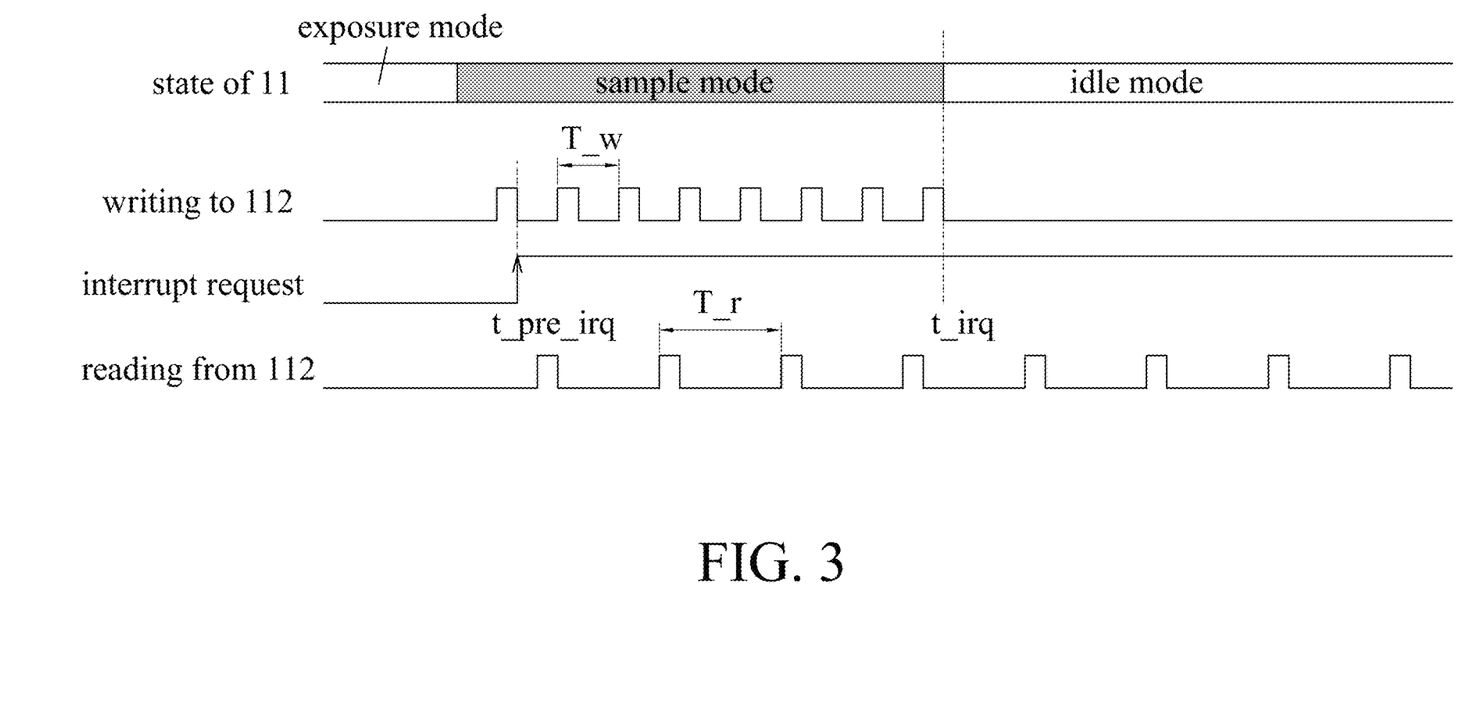
FIG. 3 is an exemplary timing diagram illustrating the first embodiment shown in FIG. 2.

FIG. 3 illustrates an exemplary timing diagram of this embodiment. Referring to FIGS. 1 and 3, in this embodiment, the pieces of pixel data are written to the data buffer 112 in batches; the batches of pixel data are written to the data buffer 112 during respective and separate time periods; and the data buffer 112 is written to at a rate of 1/T_w higher than or equal to a rate of 1/T_r at which the data buffer 112 is read from (i.e., T_w≤T_r). To maximize a time difference between the predetermined output time point and the end of the sample mode (t_irq) while ensuring that reading of each batch of pixel data from the data buffer 112 starts after writing of the batch of pixel data to the data buffer 112 ends, the predetermined output time point can be set to a time point (t_pre_irq) at which writing of a first one of the batches of pixel data to the data buffer 112 ends.

Figure 4:
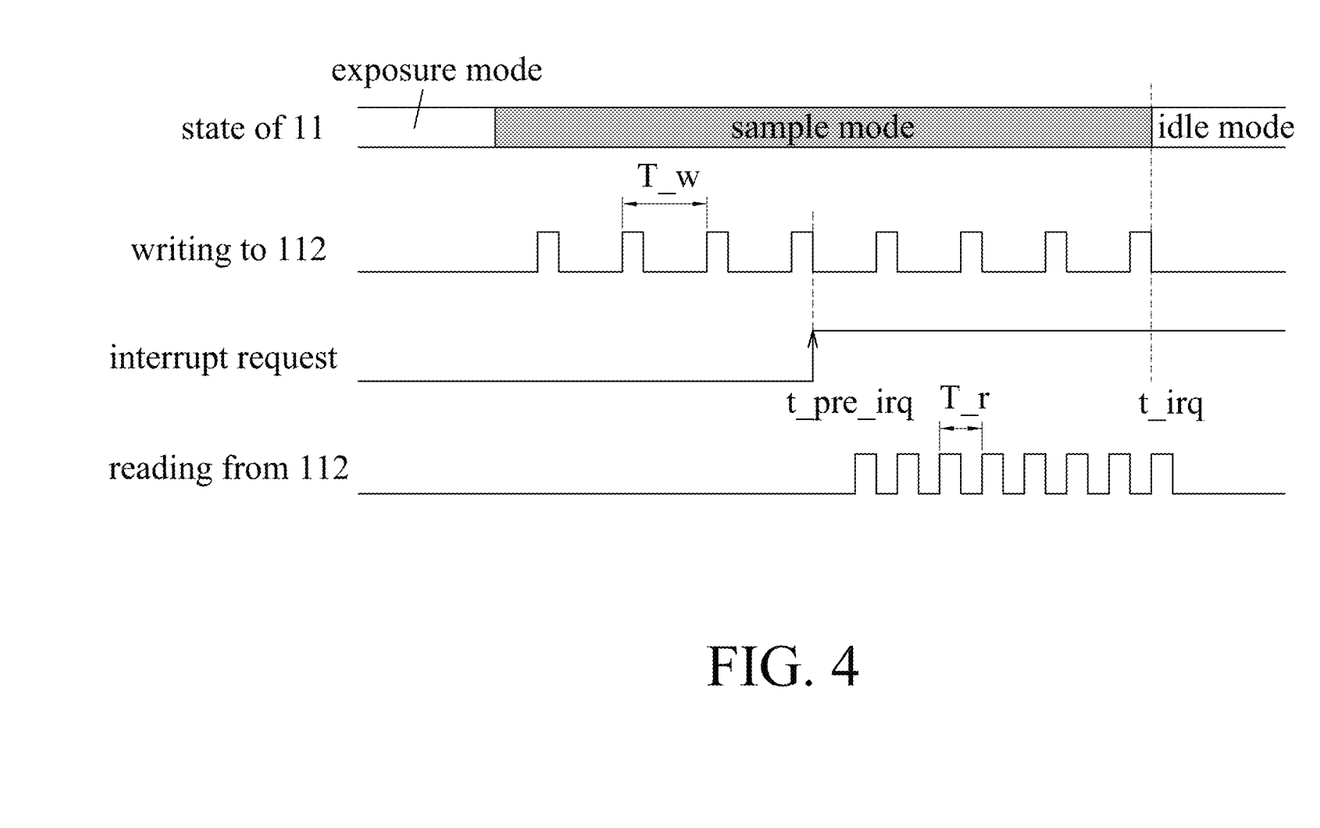
FIG. 4 is an exemplary timing diagram illustrating a second embodiment of the operating method of the optical fingerprint recognition system shown in FIG. 1 according to the disclosure.

FIG. 4 illustrates an exemplary timing diagram of a second embodiment of the operating method of the optical fingerprint recognition system 1 (see FIG. 1) according to the disclosure. Referring to FIGS. 1 and 4, the second embodiment is a modification of the first embodiment, and differs from the first embodiment in that the rate of 1/T_w at which the data buffer 112 is written to is lower than the rate of 1/T_r at which the data buffer 112 is read from (i.e., T_w>T_r). To maximize the time difference between the predetermined output time point and the end of the sample mode (t_irq) while ensuring that reading of each batch of pixel data from the data buffer 112 starts after writing of the batch of pixel data to the data buffer 112 ends, the predetermined output time point can be set to a time point (t_pre_irq) at which writing of a $P^{th}$ one of the batches of pixel data to the data buffer 112 ends, where P is sufficient to make reading of a penultimate one of the batches of pixel data from the data buffer 112 earlier than writing of a last one of the batches of pixel data to the data buffer 112, and to make reading of the last one of the batches of pixel data from the data buffer 112 later than writing of the last one of the batches of pixel data to the data buffer 112. In the example as shown in FIG. 4, where there are eight batches of pixel data, and where the rate at which the data buffer 112 is written to is half the rate at which the data buffer 112 is read from (i.e., T_w=2×T_r), the predetermined output time point can be set to the time point (t_pre_irq) at which writing of a fourth one of the batches of pixel data to the data buffer 112 ends (i.e., P=4).

Figure 5:
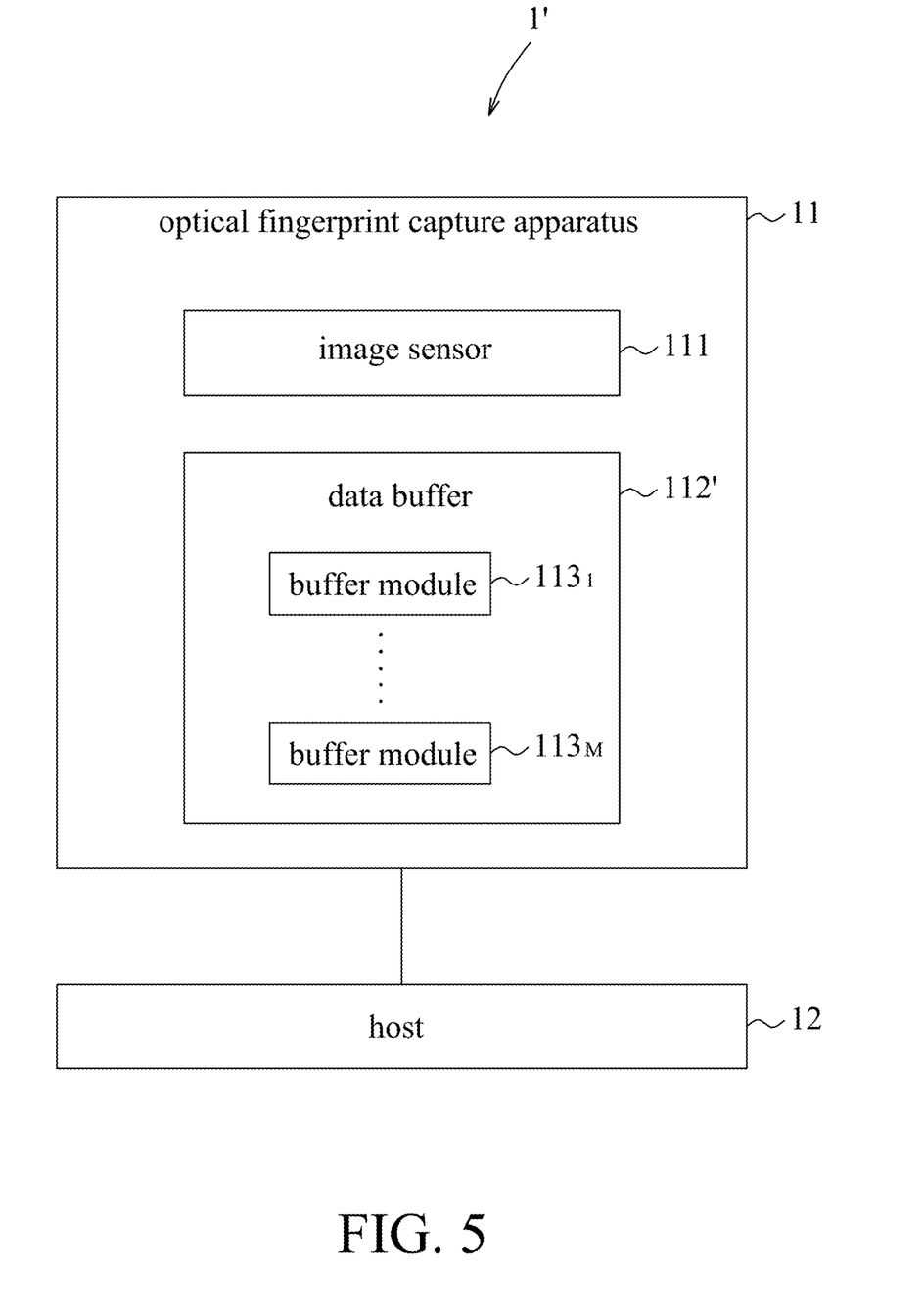
FIG. 5 is a block diagram illustrating another optical fingerprint recognition system.
Figure 6:
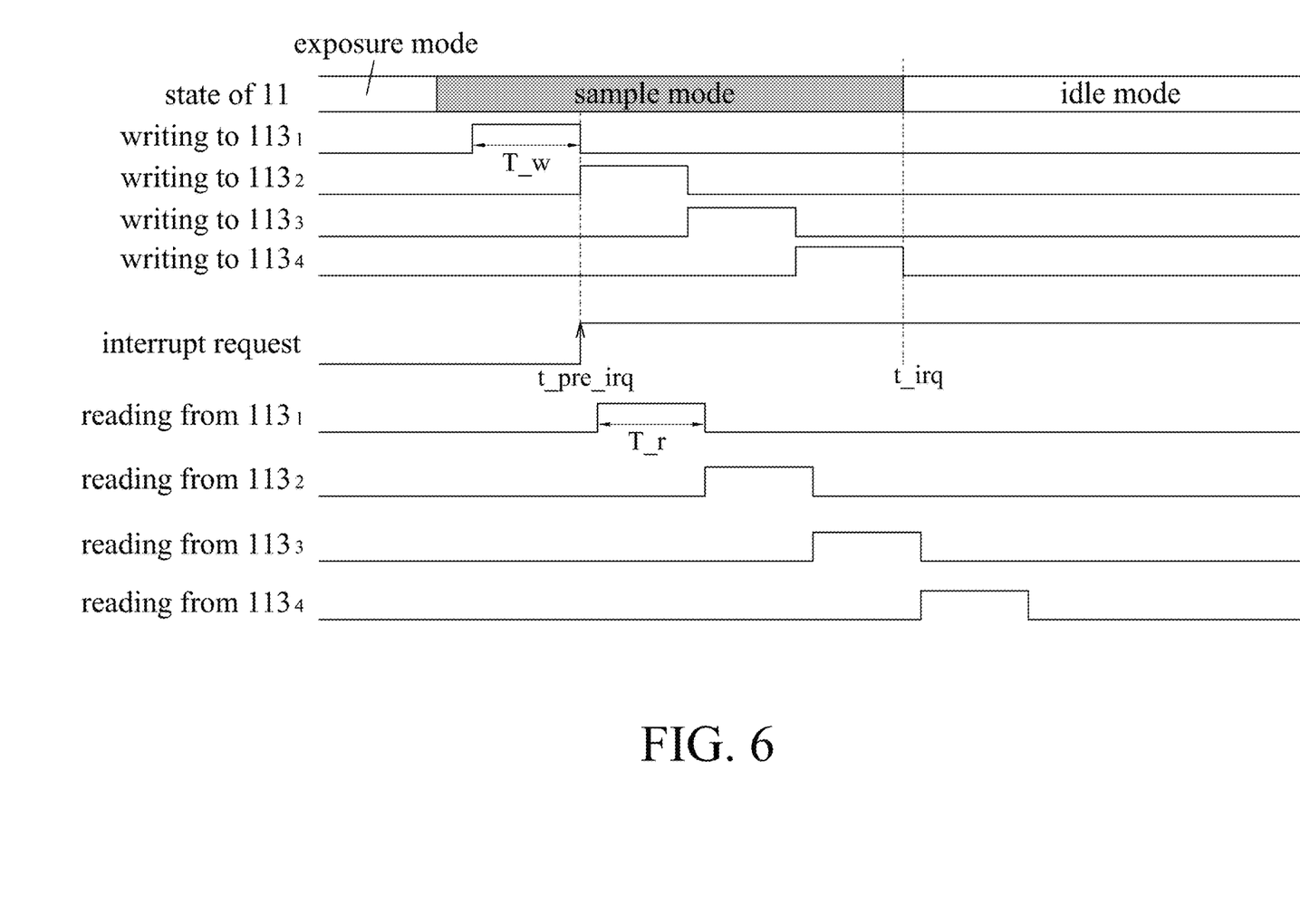
FIG. 6 is an exemplary timing diagram illustrating a first embodiment of an operating method of the optical fingerprint recognition system shown in FIG. 5 according to the disclosure.

FIG. 5 illustrates an optical fingerprint recognition system 1'. FIG. 6 illustrates an exemplary timing diagram of a first embodiment of an operating method of the optical fingerprint recognition system 1' according to the disclosure. The optical fingerprint recognition system 1' is similar to the optical fingerprint recognition system 1 (see FIG. 1), and differs from the optical fingerprint recognition system 1 in that the data buffer 112' (e.g., an SRAM device) includes a number (M) of buffer modules ($113_1$-$113_M$) (e.g., SRAM macros), where M is an integer greater than or equal to two. The first embodiment of the operating method of the optical fingerprint recognition system 1' is similar to the first embodiment of the operating method of the optical fingerprint recognition system 1, and differs from the first embodiment of the operating method of the optical fingerprint recognition system 1 in that the pieces of the pixel data are written to the data buffer 112' continuously. In particular, the buffer modules ($113_1$-$113_M$) are filled sequentially. To maximize the time difference between the predetermined output time point and the end of the sample mode (t_irq) while ensuring that reading from each data module ($113_1$-$113_M$) starts after the data module ($113_1$-$113_M$) is fully filled, the predetermined output time point can be set to a time point (t_pre_irq) by which one of the buffer modules $113_1$ is fully filled and the rest of the buffer modules ($113_2$-$113_M$) are not yet filled.

Figure 7:
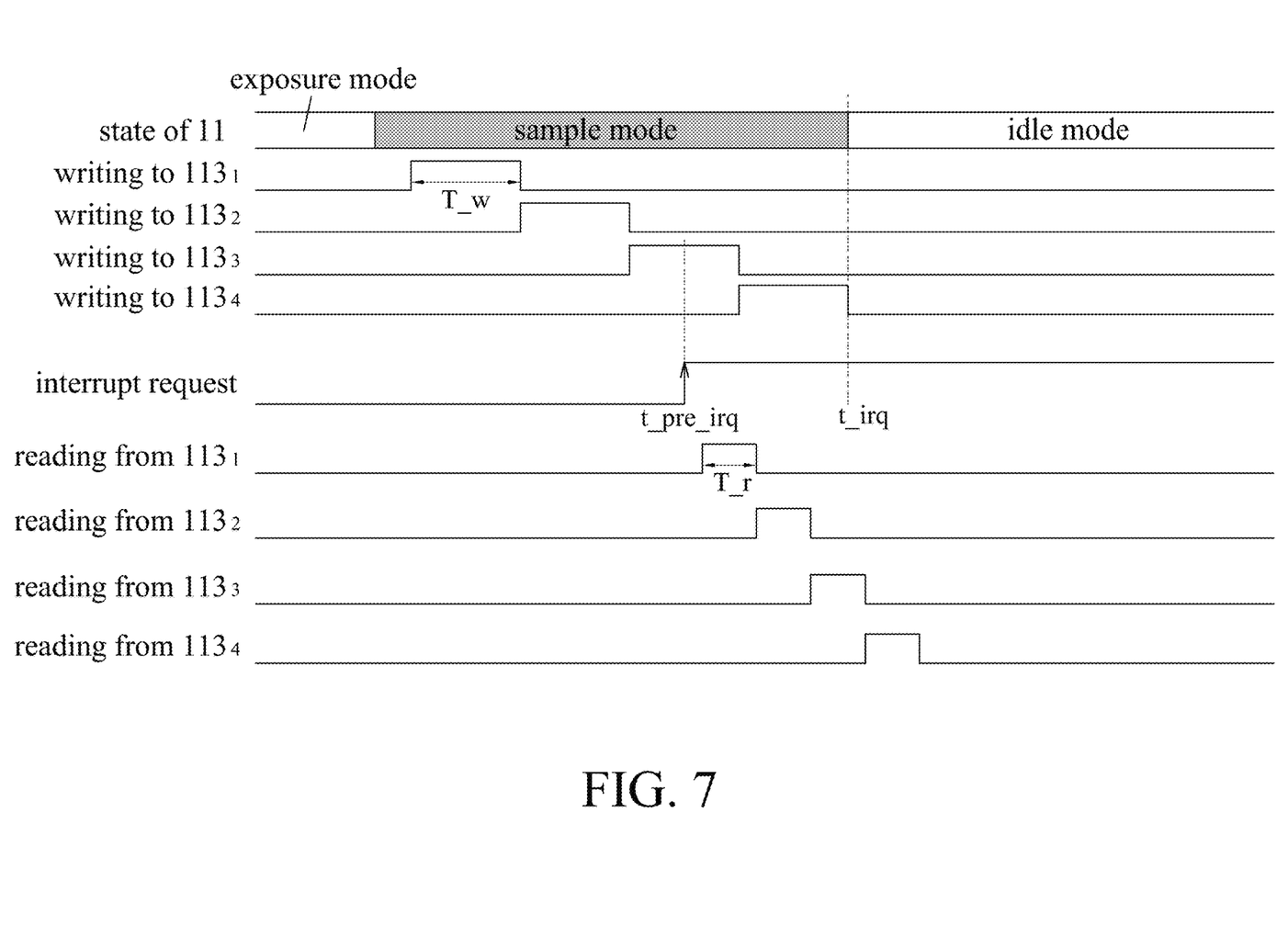
FIG. 7 is an exemplary timing diagram illustrating a second embodiment of the operating method of the optical fingerprint recognition system shown in FIG. 5 according to the disclosure.

FIG. 7 illustrates an exemplary timing diagram of a second embodiment of the operating method of the optical fingerprint recognition system 1' (see FIG. 5) according to the disclosure. Referring to FIGS. 5 and 7, the second embodiment of the operating method of the optical fingerprint recognition system 1' is a modification of the first embodiment of the operating method of the optical fingerprint recognition system 1', and differs from the first embodiment of the operating method of the optical fingerprint recognition system 1' in that the rate of 1/T_w at which the data buffer 112 is written to is lower than the rate of 1/T_r at which the date buffer 112 is read from. In other words, a ratio of N of the rate at which the date buffer 112 is read from to the rate at which the data buffer 112 is written to is greater than one. To maximize the time difference between the predetermined output time point and the end of the sample mode (t_irq) while ensuring that reading from each data module ($113_1$-$113_M$) starts after the data module ($113_1$-$113_M$) is fully filled, the predetermined output time point can be set to a time point (t_pre_irq) by which a number (P) of ones of the buffer modules ($113_1$-$113_P$) are fully filled and another one of the buffer modules ($113_{P+1}$) is filled to Q % of its capacity, where P is a greatest integer smaller than or equal to M−(M−1)/N, and where Q=(M−(M−1)/N−P)*100. In the example as shown in FIG. 7, where there are four buffer modules ($113_1$-$113_4$) (i.e., M=4), where the rate at which the data buffer 112 is written to is half the rate at which the date buffer 112 is read from (i.e., N=2), the predetermined output time point can be set to the time point (t_pre_irq) by which two of the buffer modules ($113_1$, $113_2$) is fully filled and another one of the buffer modules ($113_3$) is filled to 50% of its capacity (i.e., P=2 and Q=50).

Referring to FIGS. 1 and 5, in view of the above, for each of the aforesaid embodiments, since the predetermined output time point is earlier than the end of the sample mode, the host 12 can start reading the pieces of pixel data from the data buffer 112/112' before the end of the sample mode, which is beneficial to reduce total processing time of the optical fingerprint recognition system 1/1', especially when a total number of the pieces of pixel data is relatively large.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. An operating method of an optical fingerprint capture apparatus, the optical fingerprint capture apparatus being operatively associated with a host, and including an image sensor and a data buffer, said operating method comprising:
by the optical fingerprint capture apparatus upon receipt of a scan command from the host, entering an exposure mode where the image sensor is exposed to light carrying information of a fingerprint;
by the optical fingerprint capture apparatus upon complete exposure of the image sensor to the light, entering a sample mode where multiple pieces of pixel data that cooperatively represent an image of the fingerprint are obtained and written to the data buffer; and
by the optical fingerprint capture apparatus at a predetermined output time point that is later than a start of the sample mode and that is earlier than an end of the sample mode, outputting an interrupt request to cause the host to start reading the pieces of pixel data from the data buffer.

2. The operating method of claim 1, wherein:
the pieces of pixel data are written to the data buffer in batches; and
the batches of pixel data are written to the data buffer during respective and separate time periods.

3. The operating method of claim 2, wherein:
the data buffer is written to at a rate higher than or equal to a rate at which the data buffer is read from; and
the predetermined output time point is a time point at which writing of a first one of the batches of pixel data to the data buffer ends.

4. The operating method of claim 2, wherein:
the data buffer is written to at a rate lower than a rate at which the data buffer is read from; and
the predetermined output time point is a time point at which writing of a $P^{th}$ one of the batches of pixel data to the data buffer ends, where P is sufficient to make reading of a penultimate one of the batches of pixel data from the data buffer earlier than writing of a last one of the batches of pixel data to the data buffer, and to make reading of the last one of the batches of pixel data from the data buffer later than the writing of the last one of the batches of pixel data to the data buffer.

5. The operating method of claim 1, the data buffer including a plurality of buffer modules, wherein the pieces of the pixel data are written to the data buffer continuously.

6. The operating method of claim 5, wherein:
the data buffer is written to at a rate higher than or equal to a rate at which the data buffer is read from; and the predetermined output time point is a time point by which one of the buffer modules is fully filled and the rest of the buffer modules are not yet filled.

7. The operating method of claim 5, wherein:
the data buffer is written to at a rate lower than a rate at which the data buffer is read from; and
the predetermined output time point is a time point by which a number (P) of ones of the buffer modules are fully filled and another one of the buffer modules is filled to Q % of its capacity, where P is a greatest integer smaller than or equal to M−(M−1)/N, where Q=(M−(M−1)/N−P)*100, where M is a total number of the buffer modules, and where N is a ratio of the rate at which the data buffer is read from to the rate at which the data buffer is written to.

8. An operating method of an optical fingerprint recognition system, the optical finger print recognition system including a host, and an optical fingerprint capture apparatus that includes an image sensor and a data buffer, said operating method comprising:
by the host, transmitting a scan command to the optical fingerprint capture apparatus;
by the optical fingerprint capture apparatus upon receipt of the scan command from the host, entering an exposure mode where the image sensor is exposed to light carrying information of a fingerprint;
by the optical fingerprint capture apparatus upon complete exposure of the image sensor to the light, entering a sample mode where multiple pieces of pixel data that cooperatively represent an image of the fingerprint are obtained and written to the data buffer;
by the optical fingerprint capture apparatus at a predetermined output time point that is later than a start of the sample mode and that is earlier than an end of the sample mode, outputting an interrupt request to the host; and
by the host upon receipt of the interrupt request from the optical fingerprint capture apparatus, starting reading the pieces of pixel data from the data buffer.

9. The operating method of claim 8, wherein:
the pieces of pixel data are written to the data buffer in batches; and
the batches of pixel data are written to the data buffer during respective and separate time periods.

10. The operating method of claim 9, wherein:
the data buffer is written to at a rate higher than or equal to a rate at which the data buffer is read from; and
the predetermined output time point is a time point at which writing of a first one of the batches of pixel data to the data buffer ends.

11. The operating method of claim 9, wherein:
the data buffer is written to at a rate lower than a rate at which the data buffer is read from; and
the predetermined output time point is a time point at which writing of a $P^{th}$, one of the batches of pixel data to the data buffer ends, where P is sufficient to make reading of a penultimate one of the batches of pixel data from the data buffer earlier than writing of a last one of the batches of pixel data to the data buffer, and to make reading of the last one of the batches of pixel data from the data buffer later than the writing of the last one of the batches of pixel data to the data buffer.

12. The operating method of claim 8, the data buffer including a plurality of buffer modules, wherein the pieces of the pixel data are written to the data buffer continuously.

13. The operating method of claim 12, wherein:
the data buffer is written to at a rate higher than or equal to a rate at which the data buffer is read from; and
the predetermined output time point is a time point by which one of the buffer modules is fully filled and the rest of the buffer modules are not yet filled.

14. The operating method of claim 12, wherein:
the data buffer is written to at a rate lower than a rate at which the data buffer is read from; and
the predetermined output time point is a time point by which a number (P) of ones of the buffer modules are fully filled and another one of the buffer modules is filled to Q % of its capacity, where P is a greatest integer smaller than or equal to M−(M−1)/N, where Q=(M−(M−1)/N−P)*100, where M is a total number of the buffer modules, and where N is a ratio of the rate at which the data buffer is read from to the rate at which the data buffer is written to.

* * * * *